Dec. 26, 1967          W. B. EVANS          3,359,601
INJECTION-MOLDING MACHINE FOR PLASTICS
Filed April 14, 1965          2 Sheets-Sheet 1
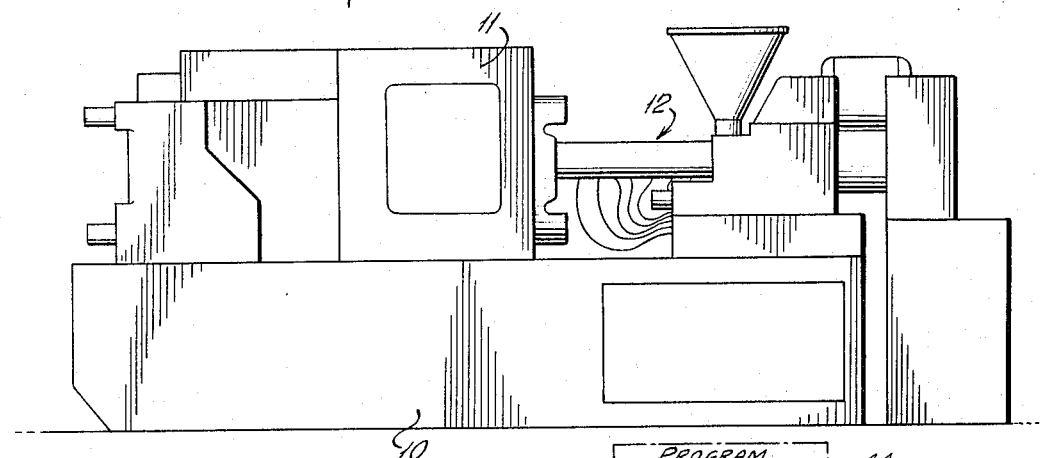
Fig.1.
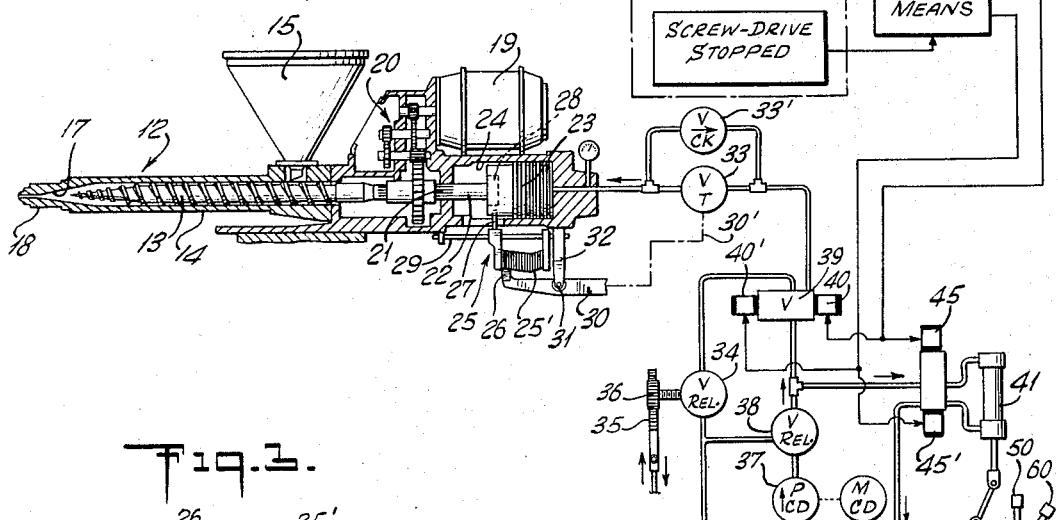
Fig.2.
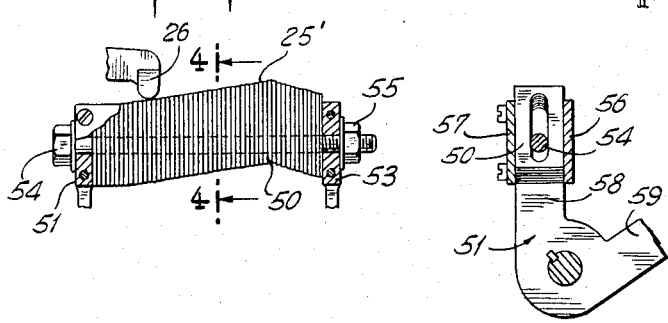
Fig.3.
Fig.4.
INVENTOR
WILLIAM BENJAMIN EVANS
BY
Hopgood & Calimafde
ATTORNEYS

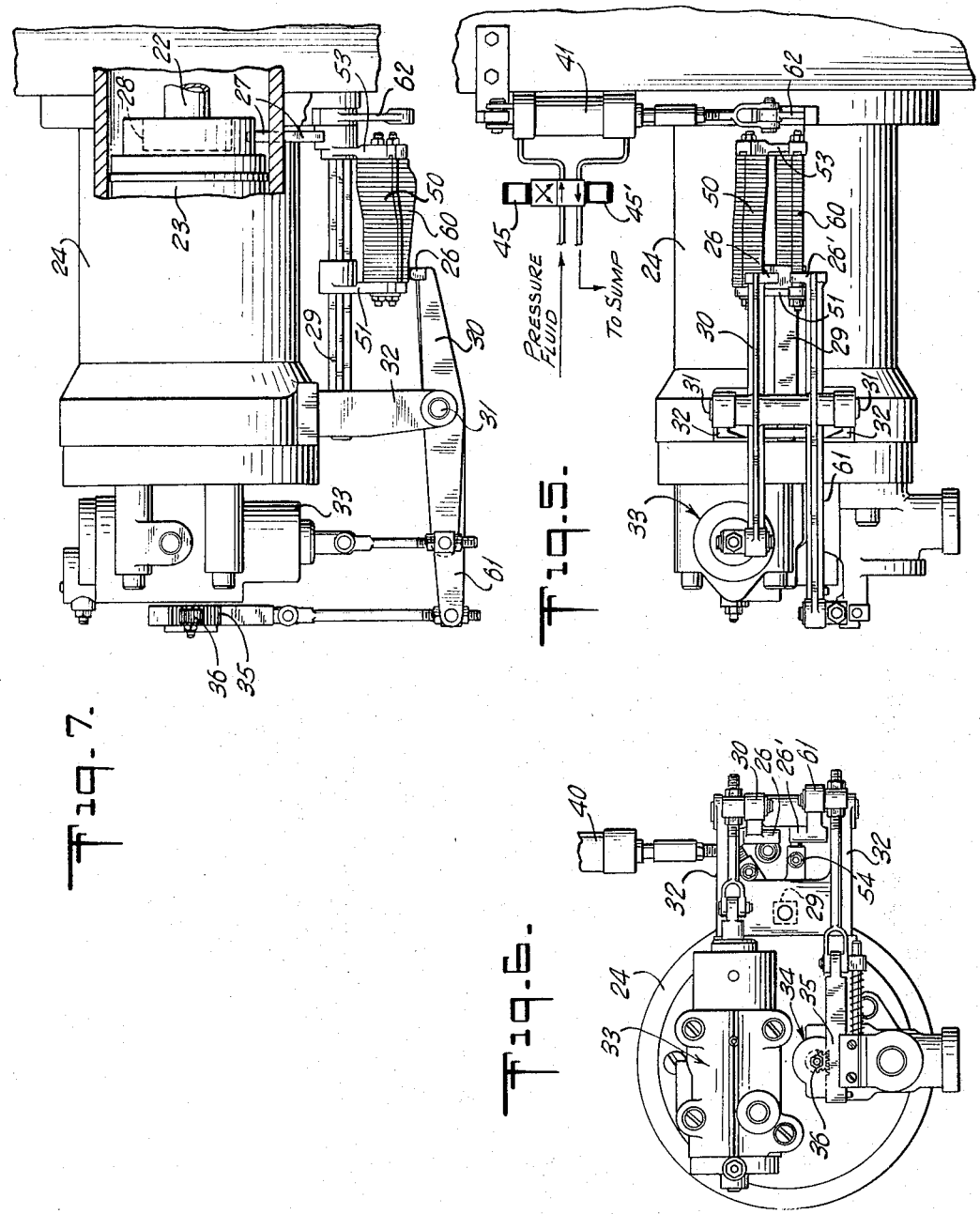

United States Patent Office 3,359,601
Patented Dec. 26, 1967

3,359,601
INJECTION-MOLDING MACHINE FOR PLASTICS
William Benjamin Evans, New Britain, Conn., assignor to The New Britain Machine Company, New Britain, Conn., a corporation of Connecticut
Filed Apr. 14, 1965, Ser. No. 448,205
14 Claims. (Cl. 18—30)

ABSTRACT OF THE DISCLOSURE

The invention contemplates improved quality of molded products in plastic injection-molding machines which employ a reciprocating plasticizing screw. Uniform quality of plasticized melt is achieved by varying the axial loading on the plasticizing screw as the new charge of plasticized melt is being accumulated, i.e, as the screw is retracting; the sense in which this loading is varied is such as to increase the axial loading on the charge as the charge is developed. In this manner, material to be plasticized may be subjected to plasticizing conditions which are substantially uniform even though the length of screw thread available for plasticizing shortens as the melt is accumulated. In accordance with a further feature of the invention, quality of product is better assured by specifically relating hydraulic feed force to the instantaneous displacement position of the screw in the feed direction. Since the adjustments necessary to optimize both the noted feeding and loading functions may vary, depending upon the size of the machine, the size and complexity of the mold, the material to be plasticized and upon other factors, the invention provides means whereby each of the indicated corrective functions may be selectively established in a program best related to screw displacement for the particular operating conditions.

---

My invention relates to an improved plastic injection-molding machine of the variety employing a reciprocating rotary plasticizing screw within an elongated chamber.

In injection-molding machines of the character indicated, material to be plasticized is introduced at the rear end of a reciprocating rotating plasticizing screw. Continuous rotation of the screw, within a confining tubular chamber, works on the material to deliver a plasticized melt at the forward end of the chamber, where pressure of the accumulating melt forces the screw back (against axial loading provided by screw-feed mechanism) until enough melt is available for a "shot." Thereafter, the melt is discharged through an injection nozzle communicating with the mold, upon forward displacement of the screw. Once injection has been accomplished, rotation of the screw serves to generate the next accumulation of plasticized melt, and the cycle repeats.

As the screw retracts in such machines, the length of screw passage available to accomplish plasticizing is shortened, and in the case of the high-volume injections (i.e., large "shots") the shortening of the screw passage may be so significant a factor as to cause inhomogeneity in the melt, resulting in molded products of less than optimum quality. Furthermore, depending upon the complexity of the mold cavity, the composition of the material to be plasticized, the size of the injection shot and other factors, something less than the optimum quality in the ultimate molded product results from merely employing a fixed feed rate for advancing the screw to effect an injection.

It is, accordingly, an object of the invention to provide an improved plastic injection-molding machine having features to offset the foregoing difficulties.

It is a specific object to provide an improved plastic injection-molding machine wherein the rate of injection may be selectively varied in order to optimize quality of molded product.

It is another specific object to provide an improved plastic injection-molding machine in which quality of plasticized melt may be assured, regardless of the extent to which a plasticizing screw must retreat in order to achieve a melt accumulation appropriate to the required injection shot size.

A still further specific object is to meet the foregoing specific objects with a single structure which automatically employs hydraulic-feed mechanism for the plasticizing screw to achieve the noted control functions, said functions being unique to both the advancing and the retracting phases of screw reciprocation.

Other objects and various further features of the invention will be pointed out or will occur to those skilled in the art from a reading of the following specification in conjunction with the accompanying drawings. In said drawings, which show, for illustrative purposes only, preferred forms of the invention:

FIG. 1 is a simplified front elevation view of a plastic injection-molding machine incorporating features of the invention;

FIG. 2 is a diagram including a simplified longitudinal sectional view of the plasticizing-screw mechanism of the device of FIG. 1, in conjunction with a schematic showing of control components of the invention;

FIG. 3 is an enlarged fragmentary sectional view of a selectively variable cam and follower employed in the structure of FIG. 2;

FIG. 4 is a sectional view taken in the plane 4—4 of FIG. 3;

FIG. 5 is an enlarged plan view of control elements of the invention applied to the hydraulic-feed mechanism of FIG. 2;

FIG. 6 is a left-end elevation of the structure of FIG. 5; and

FIG. 7 is a side view in elevation of the control mechanism of FIG. 5.

Briefly stated, the invention contemplates improved quality of molded products in plastic injection-molding machines which employ a reciprocating plasticizing screw. Uniform quality of plasticized melt is achieved by varying the axial loading on the plasticizing screw as the new charge of plasticized melt is being accumulated, i.e., as the screw is retracting; the sense in which this loading is varied is such as to increase the axial loading on the charge as the charge is developed. In this manner, material to be plasticized may be subjected to plasticizing conditions which are substantially uniform even though the length of screw thread available for plasticizing shortens as the melt is accumulated. In accordance with a further feature of the invention, quality of product is better assured by specifically relating hydraulic feed force to the instantaneous displacement position of the screw in the feed direction. Since the adjustments necessary to optimize both the noted feeding and loading functions may vary, depending upon the size of the machine, the size and complexity of the mold, the material to be plasticized and upon other factors, the invention provides means whereby each of the indicated corrective functions may be selectively established in a program best related to screw displacement for the particular operating conditions.

Referring to FIGS. 1 and 2 of the drawings, the invention is shown in application to a plastic injection-molding machine comprising an elongated frame 10 having mold support and actuating mechanism 11 at one end and reciprocating rotary plasticizing-screw mechanism 12 at the other end. In FIG. 2, the plasticizing mechanism is seen to comprise an elongated plasticizing screw 13 supported for rotation within the bore of an elongated tubular chamber 14, the screw 13 being reciprocable between retracted and advanced positions in the bore of chamber 14. In FIG. 2, the screw 13 happens to be shown in its retracted position, under which circumstance feed means such as a hopper 15 is positioned to discharge plasticizable material at a location on the screw 13 overlapped by the threaded part of the screw. When advanced to the forward position, and for the particular screw and open injection nozzle 18 shown, the tapered forward end 16 of the screw fits closely within the conically converging bore 17 of the chamber 14, said bore terminating at the injection nozzle 18; nozzle 18 is fitted to the mold unit 11 during the injection process. When the screw 13 is in its advanced position, it still overlaps the feed means 15, so that in this position rotation of the screw 13 may be effective to continue accumulation of plasticized melt forward of the screw. In the form shown, an electric motor 19 drives the screw 13 through suitable reduction gearing 20, having a splined connection at 21 to the screw shank 22.

In order to inject a charge of plasticized melt through the nozzle 18, hydraulic-feed means such as a piston 23 within a cylinder 24 is subjected to hydraulic pressure; a thrust bearing 28 permits screw rotation without rotating the piston 23. This same hydraulic mechanism 23–24 is also utilized to develop an axial loading force which is continuously applied to the screw 13 in the feeding direction as long as the screw 13 is rotated. Thus, having accomplished injection of a fresh charge of melt into a given mold, and with the screw 13 in its forwardly advanced position, rotation of the screw 13 continuously progresses new material supplied at 15 into the region at the forward end of the screw. As this charge of melt accumulates, back pressure is opposed to the loading applied by hydraulic-feed means 23–24; but this is soon overcome, and the screw 13 is forced to retreat against this loading force. When a sufficient charge has been accumulated or after the passage of sufficient time for the purpose, the loading pressure at 23–24 may be terminated (by means not shown) and the drive at 19 also terminated, pending certain operations on the mold itself, e.g., removing molded products; in other situations, it may not be necessary to stop the drive of the screw 13 or to release the loading force at 23–24.

In accordance with the invention, means are provided for so varying the operation of hydraulic means 23–24 as a function of instantaneous longitudinal position of the screw 13 that each of two specifically desired objects are optimized for the particular conditions obtaining for a particular job. In the injection or screw-advancing direction, such control involves use of a variable-flow rate control valve governing the supply of hydraulic fluid to the injection means 23–24. For the situation in which screw 13 is retreating as a fresh charge of plasticized melt is being accumulated, the control involves characterizing of the performance of a relief valve which determines the loading pressure opposing retreat of the screw 13. Selectively operable means provides optional use of either or both of these characterizing features, depending on a particular job's requirements.

In order that the indicated characterizing of hydraulic performance can be a direct function of instantaneous longitudinal position of the screw 13, I show cam and follower mechanism 25–26 reflecting this instantaneous displacement. In the form shown, the cam structure itself is bodily displaced with longitudinal displacement of the screw 13, and for this purpose the cam assembly 25 includes a position pick-off lug 27 (FIG. 2) connected to the piston 23. The cam 25 is shown mounted slidably on an elongated axial guide 29 so that for the reciprocating cycle of the screw 13 the cam profile 25' will be presented to the follower 26. The follower 26 is formed at one end of a lever or beam 30 pivoted at 31 to a bracket 32 which may be secured to the cylinder 24. At 30', I schematically indicate that the motion of lever 30 is transmitted to a flow-control valve 33 in series with the line for pressure fluid supplied to the head or actuating end of the hydraulic-feed means 23–24.

For characterizing the build-up of loading pressure during the retreating phase of reciprocation of screw 13, I employ a similar cam and follower mechanism having direct connection to a valve 34, which may be a relief valve. The connection is shown as a rack 35 shifted in response to cam-follower movement and driving a pinion 36 for adjusting the relief pressure at valve 34.

To complete the description of hydraulic parts of my mechanism, it suffices to identify a motor-driven pump 37 delivering hydraulic fluid at a first pressure determined by relief valve 38. A solenoid actuated four-way valve 39 (operated by solenoids 40 and 40') determines whether pressure at head of piston 23 is controlled by relief valve 38 or relief valve 34. When solenoid 40 is energized, pressure on piston 23 is controlled by valve 38 and when solenoid 40' is energized, pressure on piston 23 is controlled by relief valve 34. As long as solenoid 40' is energized, valve 39 isolates pump 37 and valve 38.

The adjustable flow-control valve 33 is effective during the injection portion of the cycle. During screw return, hydraulic fluid is free to flow through check valve 33', during which time flow is controlled by relief valve 34.

It is a feature of the invention that the desired characterizing of hydraulic operation during each of the two reciprocating phases of the screw 13 shall be readily adjustable, as at cam 25, to suit a particular job. In the form shown particularly in FIGS. 3 and 4, such a cam comprises a stacked plurality of like plates or washers 50 embraced between end arms or brackets 51–52 which, in turn, are guided on the slideway 29. As best seen in FIG. 4, a particular one of the plates 50 has an elongated slot permitting selective transverse placement of each plate with respect to a central clamping axis determined by a clamping bolt 54 and nut 55. Side plates 56–57 span corresponding sides of the plates 50 and loosely retain the end brackets 51–53. Thus, upon relaxation of clamping pressure at 54–55 desired profile at 25' may be introduced in the relative positioning of the plates 50, whereupon the clamps 54–55 may be set to hold the profile.

Referring to FIGS. 4, 5, 6 and 7, each of the brackets 51–53 will be seen to comprise two angularly spaced arms, one of which (58) serves one cam, such as the cam shown in FIG. 3, the other of which (59) serves a similar cam comprising stacked plates 60 but characterized with a different profile. The bracket 32 is shown to comprise a yoke pivotally supporting two independent cam-follower levers 30–61 for following the profiles of plates 50–60, respectively. Brackets 51–53 for supporting the cam assemblies have keyed engagement to the guide shaft 29, and thus are shifted in response to actuation of a crank 62, said crank being connected for operation by hydraulic actuator 41 (at the same time that valve 39 is shifted). Such actuation will be seen to effect a shift of cooperation between cam and cam follower assemblies. For example, in the solenoid-actuated position shown in FIGS. 5, 6 and 7, the cam 60 engages its follower 26' at one end of the lever 61, calling for characterized operation of the rack and pinion drive 35–36 to the relief valve 34, meaning characterized variation of relief pressure during a retracting stroke of screw 13. On the other hand, at times when solenoid 40 is energized, cam 50 is shifted into cooperating relation with its cam follower 26 on lever 30, thus establishing characterized drive or setting of the flow-control valve 33 during a forward or feeding stroke of screw 13. It is to be noted that the arrangement of cams 50–60 with relation to their followers on levers 30–61 is such that connection of one cam follower is effected at one time, the other cam and follower being disconnected at such time.

Various means may be employed to shift the hydraulic control mechanisms to accommodate injection and retraction phases of screw displacement. In general, the program means 44 in FIG. 2 happens to be shown as including a first function device responsive (for example) to the stopping of screw rotation (as when a "shot"-size melt has been "timed-out" by program means 44), to determine a first operation of relay means 43, and a second function device, responsive (for example) to completion of mold filling, to determine a second operation of relay means 43. In FIG. 2, operation of the first such function device at relay 43 is shown to energize solenoids 40 and 45, to supply pressure fluid to a hydraulic actuator 41 for positioning cam 50 in operative relation with valve 33, and for supplying injection pressures via valve 33 to piston 23. On the other hand, operation of the second such function device at relay 43 is shown to excite solenoids 40' and 45' to shift cam 60 into operative relation with relief valve 34, and for establishing controlled bleed of fluid expelled from cylinder 24 as determined by screw retraction with accumlation of a new plasticized melt.

It will be understood that, depending upon particular job requirements, one or both of the characterizing features at 50–60 may be effectively cut out (or disabled) merely by setting the applicable stack of cam plates to a straight or flat alignment.

It will be seen that the described structure is uniquely adapted to permit optimized set-up of a given machine depending upon mold complexity, material and plasticizing limitations. A typical adjustment of the cam profile applicable to an advancing displacement (i.e., injection phase) involves gradual build up of the rate of advance of the screw 13 to a maximum which is achieved prior to completion of screw advance. In the closing phase of screw advance, the rate of advance may be as low as 10 or 20% of the maximum rate of advance, thus assuring best conditions for packing the material to fill out all interstices of the mold. On the other hand, for purposes of axially loading or opposing screw retraction during accumulation of a fresh melt, it may be desired that the resisting pressure at hydraulic feed means 23–24 be built up somewhat linearly as a function of retreating displacement.

While I have described the invention in detail in connection with the preferred form shown, it will be understood that modifications may be made within the scope of the invention as defined in the claims which follow.

I claim:

1. In a plastic injection-molding machine, mold-support means, plasticizing means including an elongated tubular chamber with material feed means at one end and a mold-injection nozzle at the other end, a plasticizing screw reciprocably supported within said chamber and having threads overlapping said material feed means when in retracted position, rotary-drive means for rotating said screw within said chamber to plasticize material introduced at said material feed means, said drive means driving said screw after completion of a mold injection, whereby said screw is displaced in a retracting direction as plasticized material is accumulated in the forward end of said chamber, hydraulic-feed means, including a piston and cylinder, for longitudinally advancing said screw from its retracted position to a forward position adjacent said nozzle, said hydraulic feed means including bleed means restricting expulsion of fluid and thus continuously axially forwardly loading said screw as long as said screw is retracting, said hydraulic-feed means including variable loading control means, and selectively variable means longitudinally continuously responsive to rearward displacement of said screw and continuously connected in load-varying control relation with said hydraulic-feed means, whereby quality of accumulated melt may be better controlled as the effective length of plasticizing screw changes during melt accumulation.

2. A machine according to claim 1, in which said last-defined means includes an adjustably variable relief valve and means selectively adjusting the connection thereof to said hydraulic-feed means as a function of rearward displacement of said screw.

3. A machine according to claim 2, in which said connection includes cam and follower means, said cam having an adjustably variable profile.

4. A machine according to claim 2, in which said connection includes cam and cam follower means, said cam comprising a stacked plurality of like plate members, clamp means for releasably holding said plate members in stacked relation, each of said plate members being independently selectively positionable transverse to the clamp axis, whereby a selected cam profile may be established by desired relative transverse positioning of the various plates with respect to each other.

5. In a plastic injection-molding machine, mold-support means, plasticizing means including an elongated tubular chamber with material feed means at one end and a mold-injection nozzle at the other end, a plasticizing screw reciprocably supported within said chamber and having threads overlapping said material feed means when in retracted position, rotary-drive means for rotating said screw within said chamber to plasticize material introduced at said material feed means, said drive means driving said screw after completion of a mold injection, whereby said screw is displaced in a retracting direction as plasticized material is accumulated in the forward end of said chamber, hydraulic-feed means for longitudinally advancing said screw from its retracted position to a forward position adjacent said nozzle, said hydraulic-feed means including a variable-position control valve and control means directly responsive to advancing displacement of said screw and in position-varying controlling relation with said valve, whereby variation in the flow rate for plasticized melt injected into a mold may be controlled to achieve optimum filling of mold interstices and otherwise to enchance quality in the molded product.

6. A machine according to claim 5, in which said last-defined means includes an adjustably variable flow-control valve and means selectively adjusting the connection thereof to said hydraulic feed means.

7. A machine according to claim 6, in which said connection includes cam and follower means, said cam having an adjustably variable profile.

8. A machine according to claim 6, in which said connection includes cam and cam follower means, said cam comprising a stacked plurality of like plate members, clamp means for releasably holding said plate members in stacked relation, each of said plate members being independently selectively positionable transverse to the clamp axis, whereby a selected cam profile may be established by desired relative transverse positioning of the various plates with respect to each other.

9. In a plastic injection-molding machine, mold-support means, plasticizing means including an elongated tubular chamber with material feed means at one end and a mold-injection nozzle at the other end, a plasticizing screw reciprocably supported within said chamber and having threads overlapping said material-feed means when in retracted position, rotary-drive means for rotating said screw within said chamber to plasticize material introduced at said material-feed means, said drive means driving said screw after completion of a mold injection, whereby said screw is displaced in a retracting direction as plasticized material is accumulated in the forward end of said chamber, hydraulic-feed means including a piston and cylinder for longitudinally advancing said screw from its retracted position to a forward position adjacent said nozzle, said hydraulic-feed means including bleed means restricting explosion of fluid and thus continuously axially forwardly loading said screw as long as said screw is retracting, said hydraulic-feed means including a variably positionable flow-control valve and means responsive to advancing longitudinal displacement of said screw and in position-varying controlling relation with said valve, said hydraulic-feed means further including variable bleed-control means and means responsive to retreating longitudinal displacement of said screw and connected in load-varying controlling relation with said hydraulic-feed means.

10. A machine according to claim 9, in which said hydraulic-feed means includes a source of pressure fluid and means selectively connecting said source to said flow-control valve to the exclusion of said loading-control means, and means responsive to a mold-filled condition and including an actuator for said last-defined means for connecting said source to said flow-control valve exclusively of said loading-control means.

11. A machine according to claim 9, in which said hydraulic-feed means includes a source of pressure fluid and means selectively connecting said source to said flow-control valve to the exclusion of said loading-control means, and means responsive to a screw-drive stopped condition and connecting said piston and cylinder to said bleed means exclusively of said source.

12. A machine according to claim 9, in which said means responsive to advancing displacement includes a first characterized cam and follower mechanism, in which said means responsive to retreating displacement includes a second characterized cam and follower mechanism, and means selectively operatively relating the parts of one of said mechanisms to the exclusion of the other.

13. A machine according to claim 12, in which said last-defined means is operatively related to completion of one of the reciprocating strokes of said screw.

14. A machine according to claim 12, in which an indexible member carries at spaced locations the cams of both said cam and follower means, the followers being differently spaced but non-indexible, said last-defined means selectively indexing one to the exclusion of the other of said cam and follower means into operative relation.

References Cited
UNITED STATES PATENTS 2,734,226    2/1956    Willert _____ 19—30
3,241,185    3/1966    Hufford _____ 18—12 X WILBUR L. McBAY, *Primary Examiner.*